United States Patent
Sakaguchi et al.

(12) 
(10) Patent No.: US 6,301,957 B1
(45) Date of Patent: *Oct. 16, 2001

(54) FIBER-OPTIC CYLINDER PRESSURE SENSOR (75) Inventors: Tatsunori Sakaguchi; Shizuhisa Watanabe; Hisao Sonobe, all of Hitachinaka; Masahiro Komachiya, Hitachi, all of (JP)

(73) Assignee: Hitachi, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/210,755

(22) Filed: Dec. 15, 1998

(30) Foreign Application Priority Data

Dec. 15, 1997 (JP) .................................................. 9-345176

(51) Int. Cl.[7] .................................................. G01M 15/00
(52) U.S. Cl. .............................. 73/117.3; 73/35.12; 73/115
(58) Field of Search ................................ 73/35.07, 35.12, 73/35.13, 35.01, 112, 115, 116, 117.2, 117.3

(56) References Cited

U.S. PATENT DOCUMENTS

| 4,781,059 | * | 11/1988 | Suzuki et al. | 73/117.3 |
| 4,919,099 | * | 4/1990 | Extance et al. | 73/116 |
| 4,932,262 | * | 6/1990 | Wlodarczyk | 73/705 |
| 4,932,263 | * | 6/1990 | Wlodarczyk | 73/705 |
| 5,275,053 | * | 1/1994 | Wlodarczyk et al. | 73/705 |
| 5,385,053 | * | 1/1995 | Wlodarczyk et al. | 73/706 |
| 5,390,546 | * | 2/1995 | Wlodarczyk | 73/116 |
| 5,446,279 | * | 8/1995 | Hsu | 73/705 |
| 5,693,936 | * | 12/1997 | Komachiya et al. | 73/705 |
| 5,706,372 | * | 1/1998 | Viduya | 73/705 |
| 5,714,680 | * | 2/1998 | Taylor et al. | 73/37 |
| 5,745,611 | * | 4/1998 | Komachiya et al. | 385/13 |
| 5,763,769 | * | 6/1998 | Kluzner | 73/115 |
| 5,831,263 | * | 11/1998 | Komachiya et al. | 73/705 |

FOREIGN PATENT DOCUMENTS 60-166739   8/1985   (JP) .

* cited by examiner

Primary Examiner—Eric S. McCall
(74) Attorney, Agent, or Firm—Crowell & Moring LLP (57) ABSTRACT An on-vehicle fiber-optic cylinder pressure sensor capable of detecting the pressure within a combustion chamber with precision has an optical fiber capable of converting a change in the pressure within a combustion chamber received on its outer surface on an engine gasket into a change in the light quantity passing therethrough. A light emitting device for emitting the passed-through light; a photosenses or senses the passed-through light of which the light quantity has been changed. A converter converts the light quantity of the passed-through light into an electric signal. A reference pressure setting apparatus sets a reference electric signal. A signal processor includes an apparatus for watching a corresponding reference electric signal to the reference electric signal included in the detected electric signal.

4 Claims, 8 Drawing Sheets

LIGHT QUANTITY CONTROL MEANS
AND LIGHT EMITTING MEANS

FIG.8

PEAK-HOLD MEANS

FIG.9

CONVERSION MEANS AND
PHOTOSENSING MEANS

FIG.10

DETECTION MEANS

FIG.11

HIGH-PASS FILTER MEANS

FIG.12

OVERCURRENT DETECTION MEANS
AND CUTOFF MEANS

FIBER-OPTIC CYLINDER PRESSURE SENSOR

This application claims the priority of Japanese Patent Document No. 9-345176, filed Dec. 15, 1997, the disclosure of which is expressly incorporated by reference herein.

BACKGROUND OF THE INVENTION

1. Field of the Invention

The present invention relates to a measurement technology with fiber optics applied thereto and more particularly to an on-vehicle fiber-optic cylinder pressure sensor for measuring the pressure within the cylinder of an internal combustion engine for a motor vehicle.

2. Description of the Related Art

Of the cylinder pressure sensors for controlling the internal combustion engine for motor vehicles, that of a type detecting the pressure electrically by means of piezo-electric power has been the major one. This sensor has its advantage of being small in size and simple in structure. However, it also has such a disadvantage that a signal due to a vibration occurring at the time the valve is opened or shut or a vibration caused by some condition of the road surface is superimposed on the cylinder pressure signal. Further, this signal is easily affected by electric noises from the ignition circuit and the like or external electromagnetic noises, and therefore the S/N ratio is deteriorated making it impossible to obtain a cylinder pressure signal with precision.

Under these circumstances, there is a technology of a fiber-optic cylinder pressure sensor that is resistive to noise and easy to mount around the complicated circumference of an internal combustion engine such as disclosed in the gazette of Japanese Patent Laid-open No. sho 60-166739. According to this technology, an optical fiber is disposed around the internal combustion engine and a portion of it is arranged to pass through a case for pressure detection provided at a position of a washer of a bolt. Since the optical fiber is an electrical insulator, it has such advantages that it is not affected by electric noises, free from short-circuiting, and can be passed through a narrow space around the internal combustion engine.

Further, there is such a cylinder pressure sensor having an optical fiber, together with a pressure detecting portion, mounted within an internal combustion engine. There is also an example in which a cylinder pressure detecting and controlling system for a multi-cylinder engine is built up by using such a sensor, i.e., by using an optical fiber mounted, together with a pressure detecting portion, on the interior of the engine gasket. In this example of system structure, it is adapted such that the optical fiber receives, at the pressure receiving portion provided in each cylinder, a bending deformation corresponding to the cylinder pressure. Since the light quantity propagating through the optical fiber decreases due to the loss of light caused by the bending deformation, the cylinder pressure can be quantitatively measured according to the decrease in the light quantity.

The above described fiber-optic sensor of the prior art can be effectively used for measuring the cylinder pressure in each cylinder when installed within an engine room where it is difficult to secure sufficient space for mounting a plurality of sensors.

However, conditions in the engine room are severe, especially thermally (from −40° C. to +130° C.). Therefore, when enabling the sensor to stably operate for a long time is considered, it is preferred that the sensor be subjected to a lightened thermal burden and provided with suppressed light intensity. In practice, light intensity, for example, of 1 $\mu$W or so is enough to measure a combustion pressure. However, it is desired that the combustion pressure be precisely measured even if the return light from the optical fiber is varied for some reason or other. There is, for example, such a method wherein the light intensity from a light emitting device is controlled to be constant by keeping constant the light quantity provided to a monitoring photodiode incorporated in the light emitting means.

SUMMARY OF THE INVENTION

The above described method to control the light intensity from the light emitting device to be constant is just a method to keep constant the light quantity injected into the optical fiber and not a method to keep constant the light quantity of the return light from the optical fiber mounted on the engine gasket. Accordingly, when excessive bending is produced on the optical fiber due to temperature conditions around the engine gasket or aged deterioration caused nearby, and a light quantity loss is thereby produced, the return light quantity from the optical fiber is decreased and the accuracy in the detection of the cylinder pressure is lowered. As such, a problem remains to be solved, how to realize a detection method capable of optical measurement with a good S/N ratio even if it is carried out under the condition of an unstable return light quantity from the optical fiber due to temperature conditions around the internal combustion engine or an aged deterioration caused therein.

Another purpose of such a combustion pressure sensor is to detect a knock signal. Deterioration of the S/N ratio has been a great hindrance to detection of the knock signal with precision. Especially in the control of the internal combustion engines, it has been a problem how to precisely detect a small knock signal, in a knock frequency range of 5 to 15 kHz, leading to a hindrance to the operation.

Accordingly, an object of the invention is to provide an on-vehicle fiber-optic cylinder pressure sensor capable of precisely detecting the pressure within a combustion chamber.

An on-vehicle fiber-optic cylinder pressure sensor according to the invention for achieving the above mentioned object comprises an optical fiber having a pressure-sensitive characteristic wherein a change in the pressure within a combustion chamber of an internal combustion engine produces a corresponding change in the light quantity passing therethrough. The sensor also includes a light emitting means for providing light to the optical fiber, and a photo-sensing means for sensing the passed-through light of which the light quantity has been changed coming from the optical fiber. A conversion means converts the light quantity of the passed-through light coming from the photosensing means into an electric signal. A reference setting means sets a reference electric signal converted from the light quantity corresponding to a reference pressure. The sensor also includes a signal processing means, which includes a detection means for detecting a variation from the reference pressure of the pressure on the basis of a correlation between a detected electric signal converted from the light quantity corresponding to the pressure and the reference electric signal thereby detecting the pressure with the reference pressure taken as the reference. The signal processing means further includes a light quantity control means that monitors a corresponding reference electric signal to the reference electric signal included in the detected electric signal thereby controlling the light quantity of the passed-through light emitted from the light emitting means such that the corresponding reference electric signal and the reference electric signal agree with each other.

According to the invention, the light quantity control means monitors the corresponding reference electric signal for feedback-controlling the light quantity of the passed-through light such that the corresponding reference electric signal is brought into agreement with the reference electric signal. Even if the return light quantity from the optical fiber is varied under temperature conditions or aged deterioration caused around the engine gasket or noises are mixed in the light quantity, the sensor is able to detect the pressure within the combustion chamber with precision and provide a cylinder pressure signal constantly stabilized and having a good S/N ratio.

DESCRIPTION OF THE PREFERRED EMBODIMENTS

An embodiment of the invention will be described with reference to the accompanying drawings.

Referring first to a block diagram shown in FIG. 1, the configuration of an on-vehicle fiber-optic cylinder pressure sensor of an embodiment according to the invention will be described.

Figure 1:
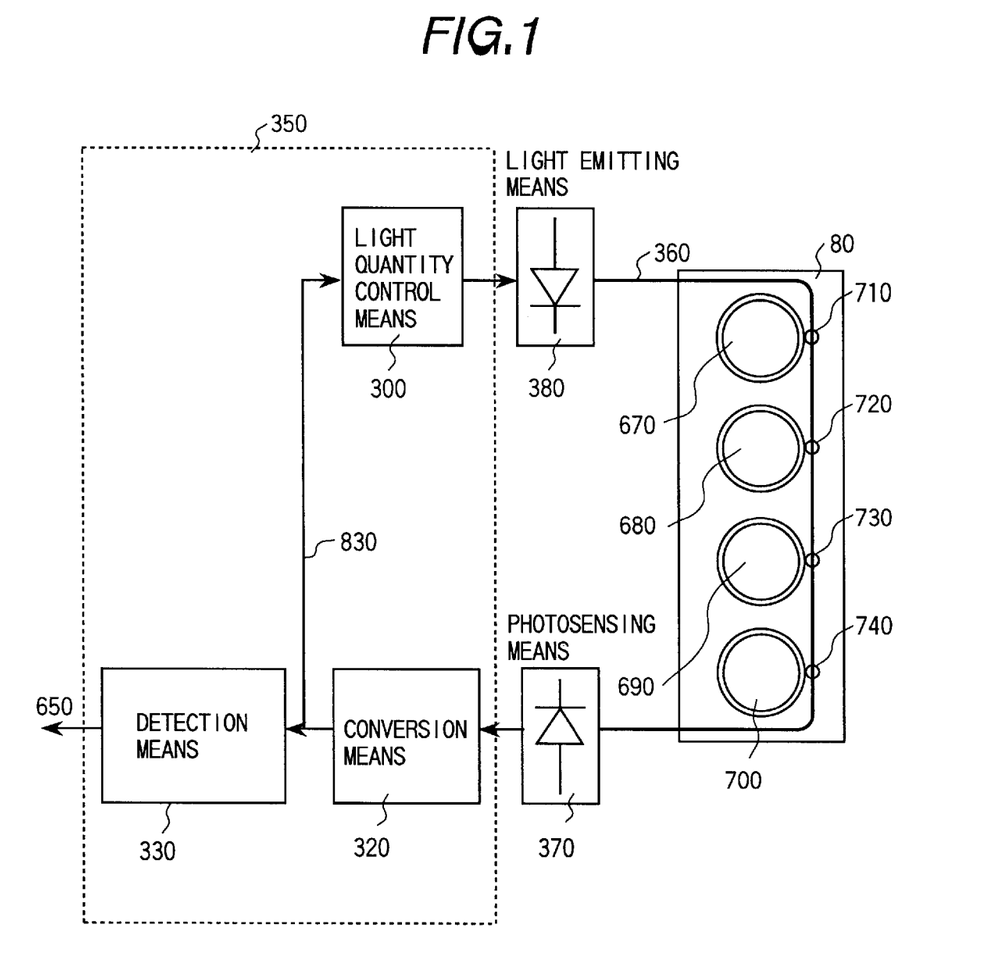
FIG. 1 is a block diagram showing an on-vehicle fiber-optic cylinder pressure sensor of an embodiment according to the invention.

In FIG. 1, the on-vehicle fiber-optic cylinder pressure sensor (hereinafter called "inner pressure sensor") of the embodiment comprises a piece of optical fiber 360 having a pressure-sensitive characteristic. More specifically, it comprises an optical fiber 360 provided with such a pressure-sensitive characteristic that receives, on its outer surface, the pressure within each combustion chamber (670, 680, 690, 700) exerting on each pressure receiving portion (710, 720, 730, 740) provided on an engine gasket 80 of an internal combustion engine. A change in the pressure on optical fiber 360 changes the light quantity passing therethrough. The inner pressure sensir also includes a light emitting means 380 for emitting the passed-through light to the optical fiber 360, a photosensing means 370 for sensing the passed-through light, of which the light quantity has been changed according to the change in the pressure, coming from the optical fiber 360. Also provided is a conversion means 320 receiving the output of the photosensing means 370 for converting the light quantity of the passed-through light into an electric signal. A reference setting means for setting a reference electric signal converted by the conversion means 320 from the light quantity of the passed-through light corresponding to a separately set reference pressure as a reference for measurement is also provided. The inner pressure sensor further comprises a signal processing means 350 for outputting a cylinder pressure signal 650 representing the pressure within the combustion chamber. Signal processing means 350 includes a detection means 330 for detecting a variation from the reference pressure of the pressure within the combustion chamber on the basis of a correlation (for example, the difference) between the reference electric signal and a detected electric signal 830 converted by the conversion means 320 from the light quantity of the passed-through light corresponding to the pressure within the combustion chamber in the processes of suction, compression, explosion, and exhaustion of the internal combustion engine, thereby detecting the pressure within the combustion chamber with the reference pressure taken as the reference. A light quantity control means 300 is provided for monitoring a corresponding reference electric signal to the reference electric signal included in the detected electric signal 830 output from the conversion means 320, thereby controlling the light quantity of the passed-through light emitted from the light emitting means 830 such that the corresponding reference electric signal and the reference electric signal agree with each other.

Namely, it is designed so that the corresponding reference electric signal included in the detected electric signal 830 in each of the cyclic processes is monitored and the light quantity emitted from the light emitting means 380 is controlled by the light quantity control means 300 such that the preset reference electric signal agrees with the corresponding reference electric signal on the basis of the reference pressure. According to the inner pressure sensor of the design as described above, the preset reference is not changed even under unstable conditions of the returned light quantity from the optical fiber due to temperature conditions around the internal combustion engine and aged deterioration occurring nearby and, hence, the pressure within the combustion chamber can be detected with precision.

Figure 2:
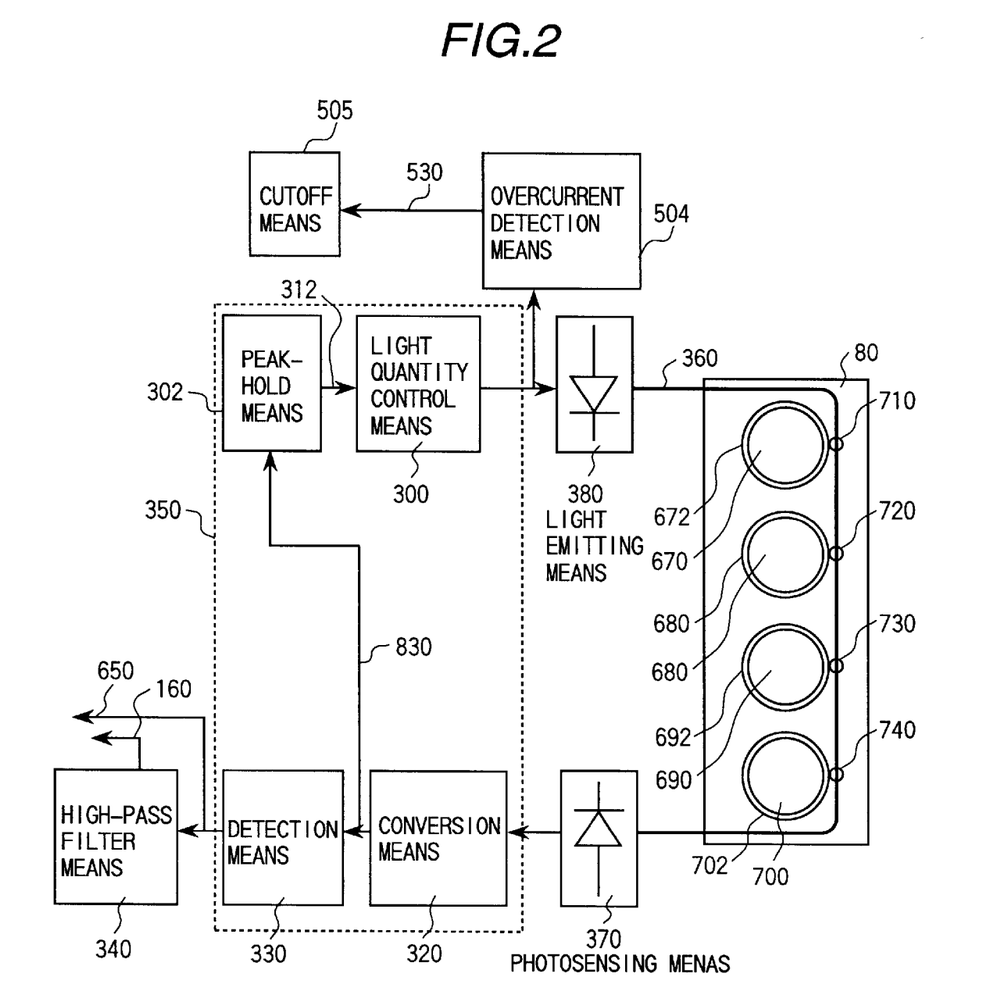
FIG. 2 is a block diagram showing an on-vehicle fiber-optic cylinder pressure sensor of another embodiment according to the invention.

FIG. 2 is a drawing showing an on-vehicle fiber-optic cylinder pressure sensor of another embodiment according to the invention. The inner pressure sensor of the second embodiment has a maximum value holding means (hereinafter referred to as "peak-hold means") 302 added to the signal processing means 350 of the inner pressure sensor of the first embodiment. The second embodiment, is adapted such that a peak-hold signal 312 obtained by the peak-hold means 302 holding the maximum value of the detected electric signal is used as the corresponding reference electric signal, to be monitored, in the detected electric signal, whereby the watching of the corresponding reference electric signal is made easier. This is because the pressure indicating the maximum value (peak value) of the detected electric signal is used as the reference pressure which is preset generally. The inner pressure sensor of the second embodiment shown in FIG. 2 may be of a configuration having a high-pass filter means 340 to be described later additionally provided thereto. Further, the inner pressure sensor of the second embodiment may be additionally provided with an overcurrent detection means 504 and a cutoff means 505 to be described later.

The characteristic features of the above described inner pressure sensor of the invention will be described in detail in due order. First, mounting of the inner pressure sensor in an internal combustion engine will be described with reference to FIG. 3.

Figure 3:
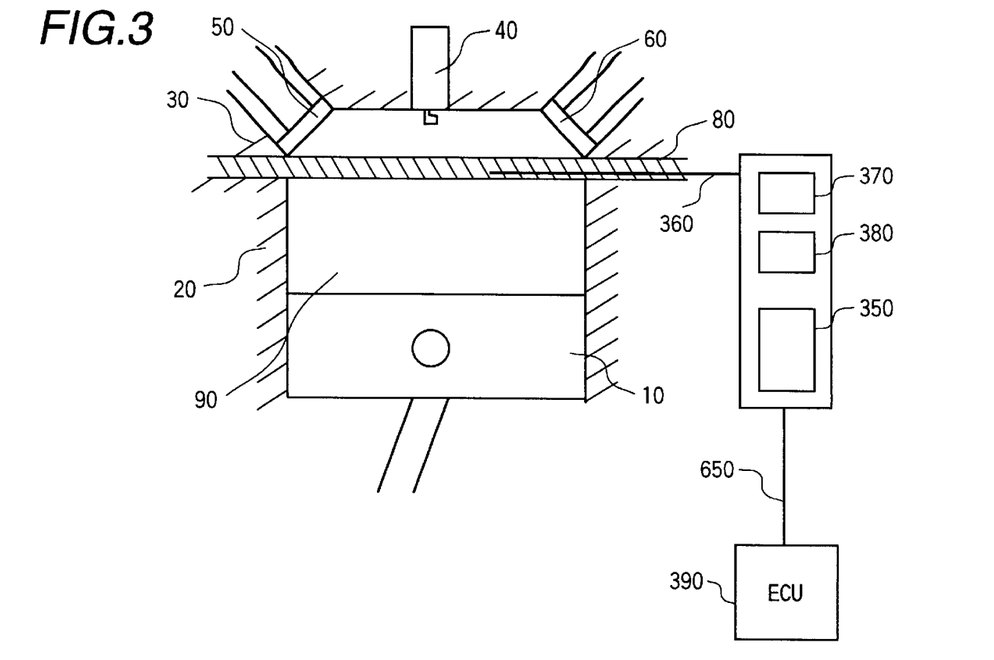
FIG. 3 is a drawing showing a manner of mounting in an internal combustion engine of an inner pressure sensor of an embodiment according to the invention.

Referring to FIG. 3, the optical fiber 360 of the inner pressure sensor of the described structure is mounted on the interior of an engine gasket 80 of the internal combustion engine comprising an engine block 20 including a piston 10 and a cylinder 90, an engine head 30 including an ignition plug 40, a suction valve 50, and an exhaust valve 60, and the engine gasket 80 disposed between the engine block 20 and the engine head 30. Further, the photosensing means 370, light emitting means 380, and the signal processing means 350 as the other components than the optical fiber 360 of the inner pressure sensor are generally disposed at places somewhat apart from the engine gasket 80 in such a way that the optical fiber 360 having the pressure-sensitive characteristic and the light emitting means 380, as well as the optical fiber 360 and the photosensing means 370, are optically connected with each other by an optical fiber (not shown) having no pressure-sensitive characteristic and an optical connector (not shown). The inner pressure of the cylinder 90 as a combustion chamber detected by means of the deformation of the optical fiber 360, which is disposed at each pressure receiving portion on the engine gasket 80 in the vicinity of each cylinder, is output as a cylinder pressure signal 650 from the inner pressure sensor and this signal is transmitted, for example, to a well-known engine control unit 390 of an engine control system for use therein.

Description of waveforms of the cylinder pressure of a four-cycle engine, i.e., behaviors of the inner pressure of a cylinder 90 with respect to the crank angle will be given below with reference to FIG. 3 and FIG. 4.

Figure 4:
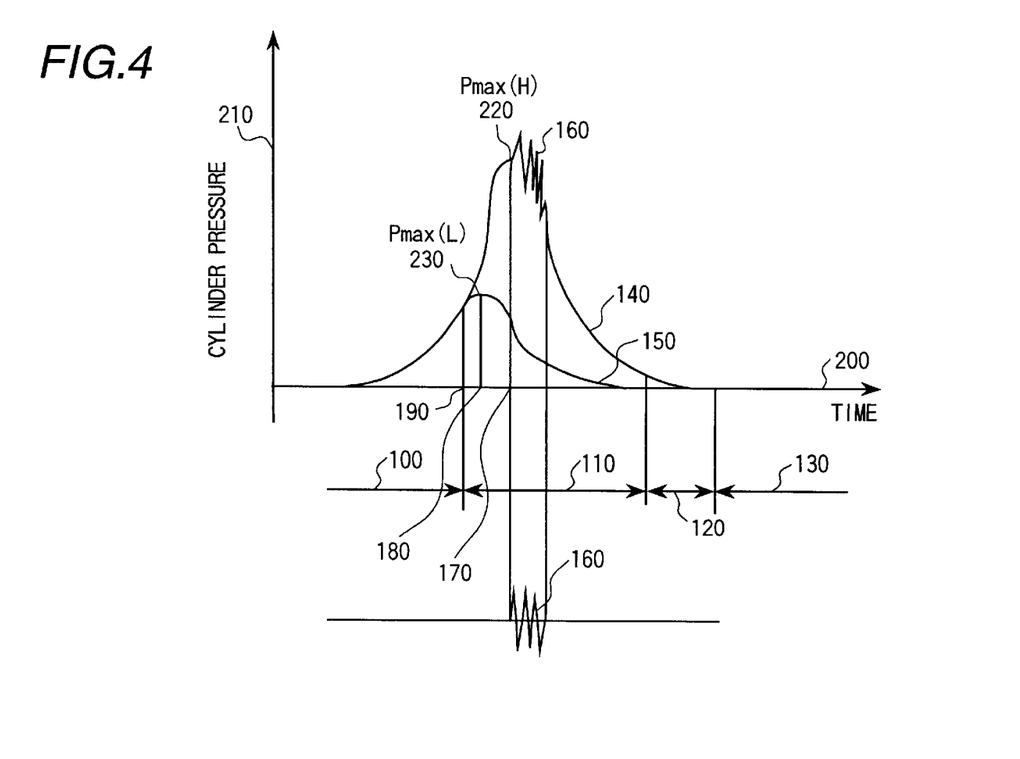
FIG. 4 is a diagram showing waveforms of the cylinder pressure in a four-cycle engine.

Referring to FIG. 4, the four-cycle engine has four processes, i.e., the compression process 100, explosion process 110, exhaust process 120, and the suction process 130. In the compression process 100, the suction valve 50 and the exhaust valve 60 in FIG. 3 are both shut and the mixed gas of the air and fuel within the cylinder 90 is compressed by means of a piston 10 so that the pressure within the cylinder is increased. In the explosion process 110, the mixed gas is ignited by an ignition plug 40 so that the mixed gas is exploded. In the exhaust process 120, the exhaust valve 60 is opened so that the gas generated during combustion is exhausted and, in the suction process 130, the suction valve 50 is opened and the mixed gas of the air and fuel is taken into the cylinder and the cycle returns to the compression process 100.

The knock signal 160 is generated when the cylinder pressure 210 comes near the maximum value Pmax (H) 220. While the frequency range of the knock signal 160 varies with the inner diameter of the cylinder, it generally exceeds 5 kHz. Therefore, by passing the cylinder pressure waveform 140 through a high-pass filter whose cutoff frequency is around 5 kHz, it becomes possible to extract only the knock signal 160.

In the event of a failure of ignition, since there is produced no pressure increase in the explosion process 110, a cylinder waveform 150 during motoring, in which the cylinder pressure is not built up all over the cycle, is obtained.

Therefore, the maximum value Pmax(L) 230 of the cylinder pressure waveform 150 during motoring becomes generally lower than the maximum value Pmax(H) 220 of the cylinder waveform 140 in the combustion process.

Now, each of the signal waveforms that are detected by the inner pressure sensor structured as shown FIG. 3 according to variations of the cylinder pressure in the four-cycle engine structured as shown in FIG. 4 will be described.

Referring to FIG. 1 and FIG. 2, the optical fiber 360 mounted on the engine gasket 80 for detecting each cylinder pressure generated in each of the first cylinder, second cylinder, third cylinder, and the fourth cylinder is attached to the pressure receiving portions 710, 720, 730, and 740 in the vicinity of seal portions 672, 682, 692, and 702 of their respective cylinders. The signal waveforms detected by the inner pressure sensor are as shown in the chart of FIG. 5.

Figure 5:
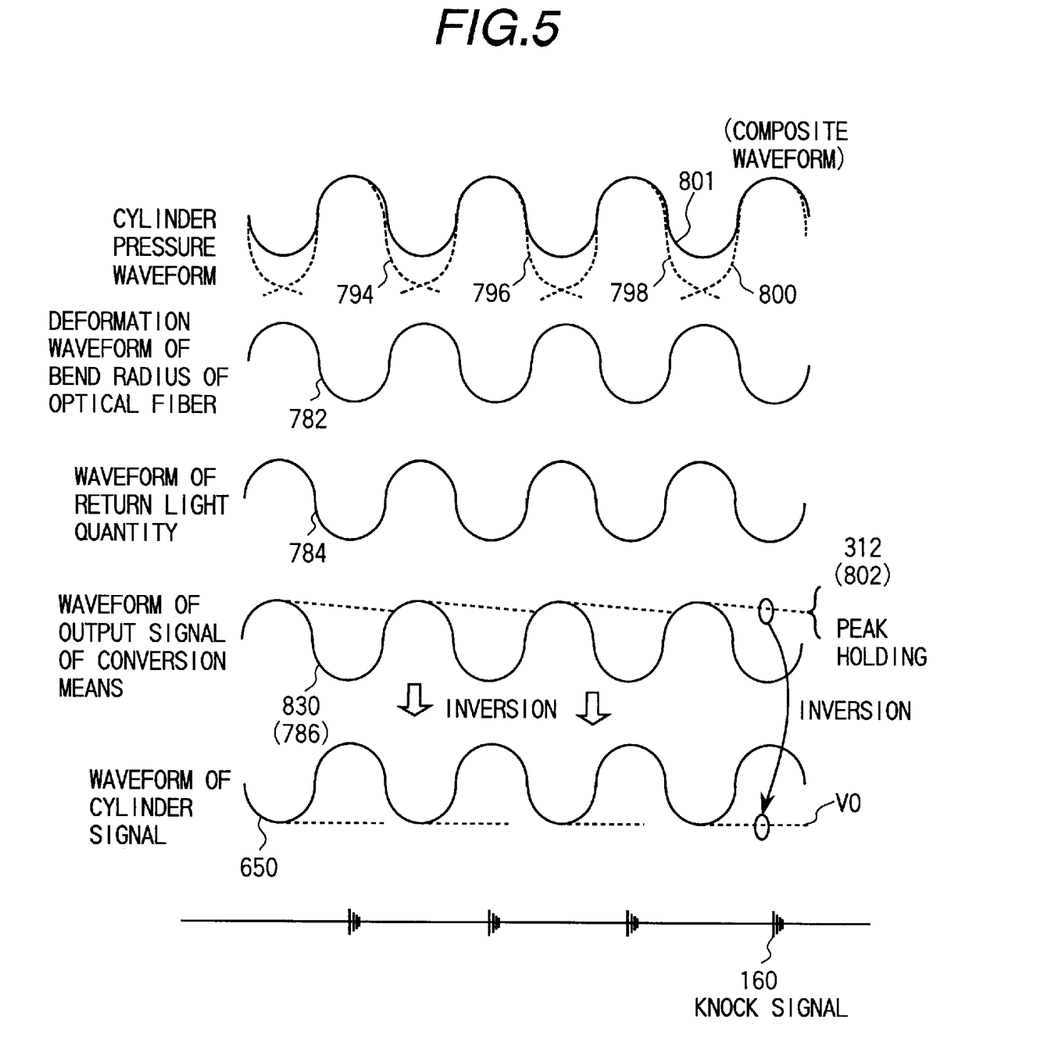
FIG. 5 is a chart showing various signal waveforms corresponding to variations of the cylinder pressure detected by the inner pressure sensor.

Namely, the waveforms of the cylinder pressure generated in each of the cylinders are shown by the cylinder pressure waveforms 794, 796, 798, and 800 in FIG. 5 in the order of the first cylinder, third cylinder, fourth cylinder, and the second cylinder. Further, in the case of the four-cylinder engine, the cylinder pressure waveforms 794, 796, 798, and 800 are expressed as a composite waveform 801, in which the adjoining cylinder pressure waveforms are overlapping each other at intervals of 180 degrees. In the present invention, it is intended that the cylinder pressure signal 650 output from the inner pressure sensor faithfully reproduce the composite waveform 801.

Figure 6:
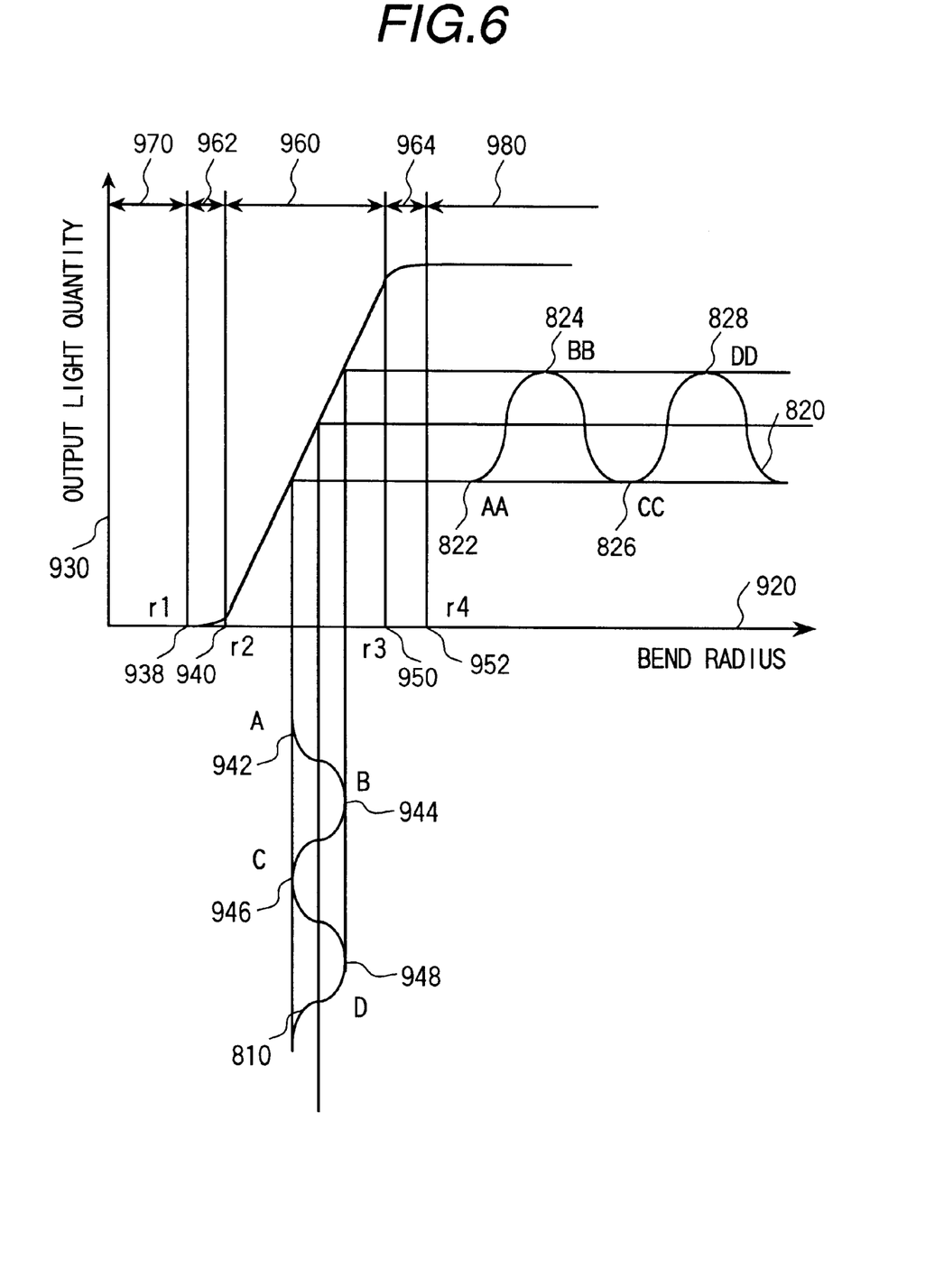
FIG. 6 is a graph showing an "optical fiber output light quantity—bend radius"characteristic.

The "output light quantity-bend radius" characteristic of the optical fiber 360 used in the inner pressure sensor producing the waveform as shown in FIG. 5 will be described with reference to FIG. 6.

The output light quantity 930 of the optical fiber 360 taken along the axis of ordinates in FIG. 6 has such a characteristic, with respect to the bend radius 920 of the optical fiber 360 taken along the axis of abscissas, that exhibits a linear characteristic domain 960 between two specific bend radiuses r2 (940) and r3 (950) and saturated characteristic domains (970, 980) below the bend radius r1 (938) and above the bend radius r4 (952). And, in other ranges of the bend radius, i.e., where the bend radius is between r1 and r2 and between r3 and r4, there are formed nonlinear characteristic domains (962, 964). The optical fiber 360 is disposed at the pressure receiving portions 710, 720, 730, and 740 of each cylinder such that its bend radius 920 varies within the linear characteristic domain 960.

When, in accordance with the above described "output light quantity—bend radius" characteristic of the optical fiber 360, the actual bend radius 782 of the optical fiber 360 has varied as indicated by the deformed waveforms of the bend radius as shown in FIG. 5 corresponding to the composite waveform 801 of the cylinder pressure at the positions of the pressure receiving portions 710, 720, 730, and 740 of FIG. 1, the return light quantity 784 through the optical fiber 360 becomes as indicated by the return light quantity waveform shown in FIG. 5.

The return light quantity 784 of the optical fiber 360 allows a photoelectric current to be generated in the photosensing means 370. The photoelectric current is used for two purposes. For one purpose, it is used in the light quantity control means 300 for controlling the drive current of the light emitting means 380 such that the photoelectric current used as the reference is kept constant.

For the other purpose, it is used, after being passed through the conversion means 320 and the detection means 330, for obtaining the cylinder pressure signal 650 (and, according to the need, the knock signal 160).

Configurations of individual components of the inner pressure sensor according to the invention and the operations of the same will be described in detail.

First, the configuration of the light quantity control means 300 for controlling the light emitting means 380 of an embodiment and the operation thereof will be described with reference to FIG. 7.

Figure 7:
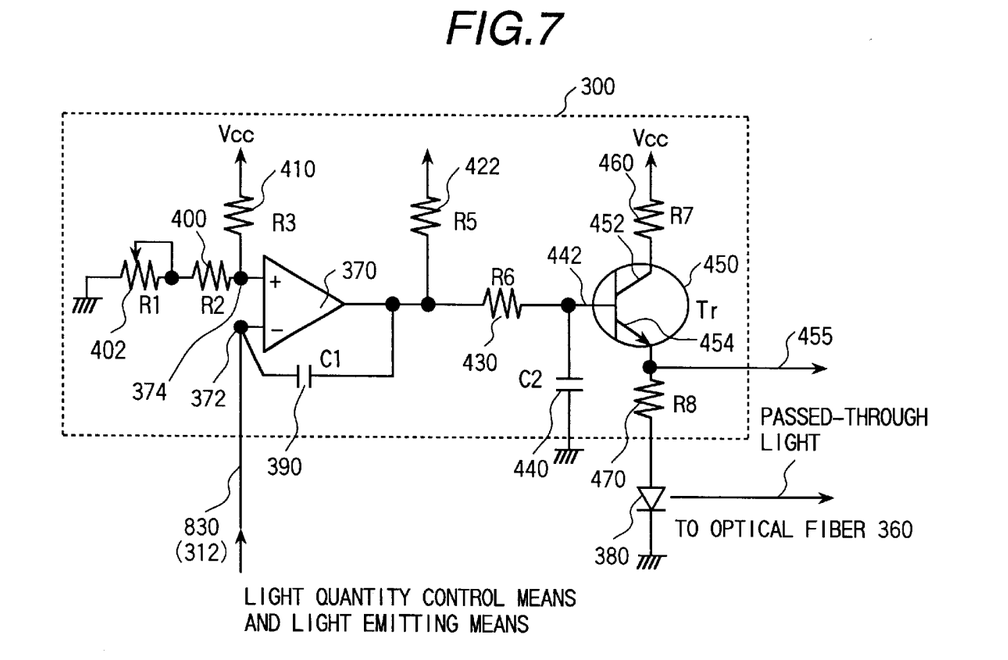
FIG. 7 is a circuit diagram showing a light quantity control means of an embodiment according to the invention.

Referring to FIG. 7, the light quantity control means 300 comprises a constant voltage circuit made up of a resistor R1 (402), a resistor R2 (400), and a resistor R3 (410), a determination circuit made up of a comparator 370 and a capacitor C1 (390) for preventing oscillation of the comparator 370, an integrating circuit made up of a resistor R5 (422), a resistor R6 (430) as a measure against external noises, and a capacitor C2 (440), and a drive circuit made up of resistors R7, R8 (460, 470) and a transistor 450.

The operation of the light quantity control means 300 of the above described configuration will be described as related separately to the first embodiment and the second embodiment.

In the light quantity control means 300 of the first embodiment shown in FIG. 1, the detected electric signal 830 including the corresponding reference electric signal in the combustion chamber of each cyclic process converted by the conversion means 320 is input to the one, inverting, input terminal 372 of the comparator 370. The other, noninverting, input terminal 374 is supplied with a voltage $V_{OS}$ determined by the three resistors R1(402), R2(400), and R3(410). The voltage $V_{OS}$ is a reference electric signal separately set up on the basis of the reference pressure for measurement (for example, 1 atm press.).

Accordingly, the determination circuit having a watching function in the light quantity control means 300 outputs such a control signal that increases the current supplied to the light emitting means 380 when the voltage $V_{OS}$ of the reference electric signal at the noninverting input terminal 374 is higher than the voltage $V_0$ of the corresponding reference electric signal included in the detected electric signal 830 and decreases the current supplied to the light emitting means 380 when it is lower than the voltage $V_0$ of the corresponding reference electric signal, so that the voltage $V_0$ of the corresponding reference electric signal is equalized, i.e., brought into agreement, with the voltage $V_{OS}$ of the reference electric signal at all times. Then, the increased or decreased output signal from the comparator 370 is input to the base 442 of the transistor 450 through the integrating circuit.

The drive circuit having the controlling function within the light quantity control means 300 performs control such that the current as the increased or decreased output signal input to the base 442 is amplified and flown from the collector 452 to the emitter 454, whereby the current for driving the light emitting means 380 is increased or decreased, and finally the light quantity of the passed-through light emitted from the light emitting means 380 is increased or decreased.

In other words, the light quantity control means 300 watches the corresponding reference electric signal included in the detected electric signal 830 and performs feedback control on the light quantity of the passed-through light provided to the optical fiber 360 so that the corresponding reference electric signal is kept constant at all times.

It is considered here to set the average pressure within the combustion chamber in the suction process shown in FIG. 4 (i.e., atmospheric pressure≈1 atm press.) as the reference pressure and watch the corresponding reference electric signal corresponding to the actual pressure in each suction process (i.e., the point at which the detected electric signal of the corresponding reference electric signal corresponding to the pressure in the suction process is at the maximum value). In other words, setting of the reference electric signal and the corresponding reference electric signal in accordance with an ideal pressure point, at which the reference pressure for measurement and the watched pressure are in good agreement, is preferable.

On the other hand, in the light quantity control means 300 in the second embodiment shown in FIG. 2, the peak-hold signal 312 as the maximum value hold signal extracted by the peak-hold means 302 from the detected electric signal 830 is input to the inverting input terminal 372 of the comparator 370. This is aimed at ensuring the watching of the corresponding reference electric signal.

The light quantity control means 300 for making the watching and controlling increases the light quantity from the light emitting means 380 when the voltage $V_{OS}$ at the noninverting input terminal 374 is higher than the voltage $V_0$ of the peak-hold signal 312 generated from the detected electric signal 830 and decreases the light quantity from the light emitting means 380 when it is lower than the voltage $V_0$ of the peak-hold signal 312, so that the voltage $V_0$ of the corresponding reference electric signal, i.e., the peak-hold signal 312, is controlled to be constantly equal to the voltage $V_{OS}$ of the reference electric signal established on the basis of the reference pressure for measurement.

More specifically, even when the return light quantity 784 from the optical fiber 360 is reduced and the corresponding reference electric signal is varied by occurrence of excessive bending of the optical fiber 360 on the interior of the engine gasket 80 due to environmental conditions such as temperature condition or aged deterioration, the voltage $V_0$ of the corresponding reference electric signal (which for example is the peak-hold signal 312 as the output waveform 802 of the DC component held by the peak-hold means 302) included in the output signal 786 of the conversion means 320 (i.e., the detected electric signal 830), which takes up the waveform shown in FIG. 5, is monitored so that it is equalized with the voltage $V_{OS}$ of the reference electric signal at the noninverting input terminal 374 of the comparator 370. In other words, the return light quantity 784 from the optical fiber 360 during normal operation is controlled to be constant. That is, in the inner pressure sensor of the invention, the cylinder pressure signal 650 of the inner pressure sensor is faithfully reproduced with respect to the composite waveform 801.

Now, the peak-hold means 302 in an embodiment for generating the peak-hold signal from the corresponding reference electric signal included in the detected electric signal will be described.

Figure 8:
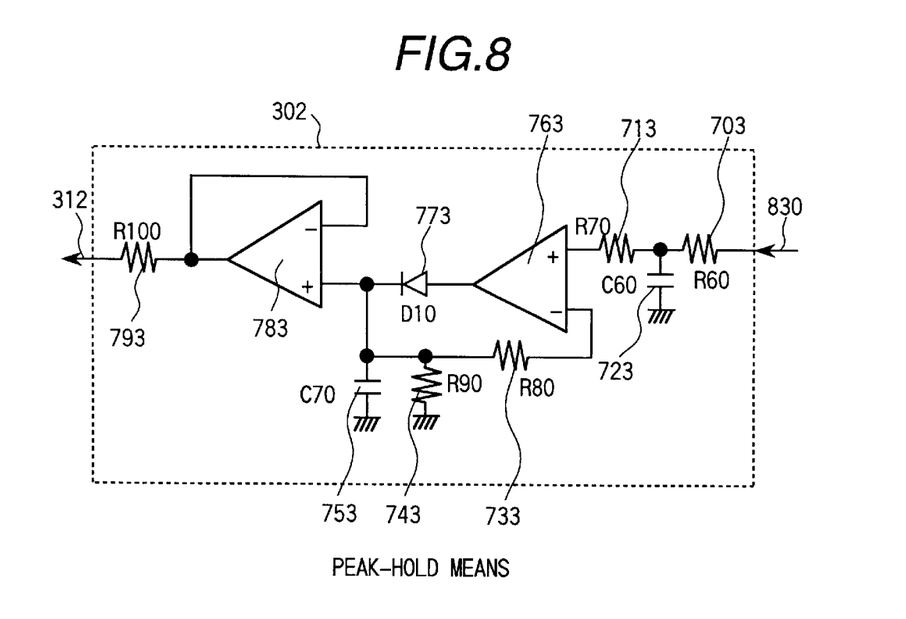
FIG. 8 is a circuit diagram showing a peak-hold means of an embodiment according to the invention.

Referring to FIG. 8, the peak-hold means 302 comprises an integrating circuit made up of an antinoise resistor 703, a capacitor C60 (723), and a resistor 713, an amplifier 763, a diode 773 for extracting a DC component, a discharging circuit made up of resistors 733, 743 and a capacitor C70 (753), and an amplifying circuit made up of an amplifier 783 and a buffer resistor R100 (793).

The operation of the peak-hold means 302 of the above described configuration is as follows. The detected electric signal 830 including the corresponding reference electric signal which has been converted by the conversion means 320 is input to the noninverting input terminal of the amplifier 763 through the integrating circuit. By having the output signal therefrom rectified by the diode 773, the maximum value of the waveform of the detected electric signal 830 as shown in FIG. 5 is stretched, i.e., the maximum value is retained for a predetermined period of time by the discharging circuit and a DC component is generated, and this DC component is taken out as the corresponding reference electric signal. In other words, since the maximum value as the corresponding reference electric signal is retained for the predetermined period of time, the watching of the corresponding reference electric signal can be ensured.

The discharging period as the period of time for retaining the maximum value is determined by the time constant of the discharging circuit, i.e., the product of the capacitance C70 (753) and the resistance R90 (743). And, the peak-hold signal 312 generated by peak-holding the maximum value of the detected electric signal 830 is input, through the amplifying circuit, to the inverting input terminal 372 of the comparator 370 in the light quantity control means 300.

The time constant of the peak-hold means employed in the inner pressure sensor of the second embodiment is set at a value within the range of 5 to 10 times the period of the engine number of revolutions during the cranking of the internal combustion engine. This is because, when the value is below 5 times, the maximum value retaining period becomes so short as to distort the reference pressure level of the cylinder pressure waveform and cause a measurement error and, when the value is over 10 times, the maximum value retaining period becomes so long as to deteriorate the response.

Now, with reference to FIG. 9, the configuration and operation of the conversion means 320 of an embodiment for obtaining the detected electric signal 830, including the corresponding reference electric signal, from the photosensing means 370 will be described.

Figure 9:
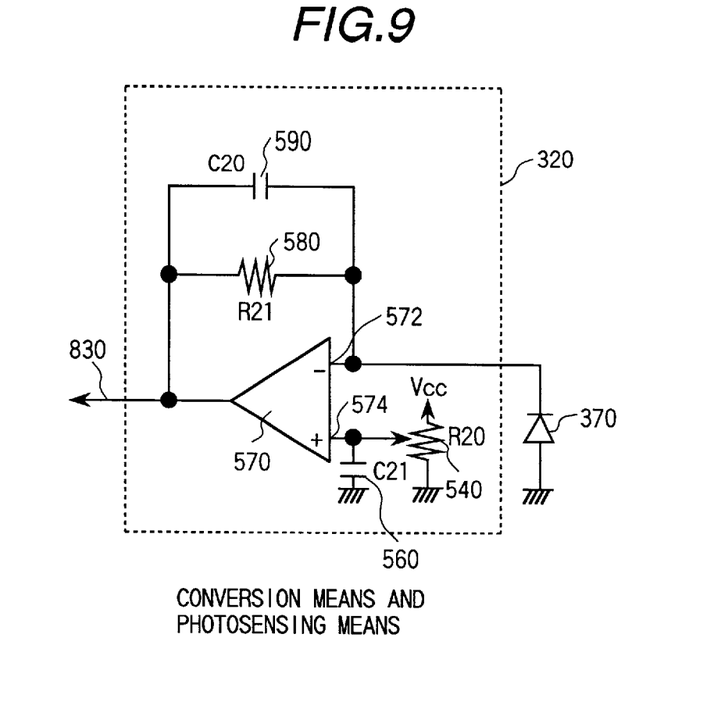
FIG. 9 is a circuit diagram showing a conversion means of an embodiment according to the invention.

The photoelectric current generated in the photosensing means 370 in accordance with the return light quantity 784 from the optical fiber is input to the inverting input terminal 572 of the amplifier 570 in the conversion means 320 shown in FIG. 9.

The voltage proportional to the product of the value of the photoelectric current and the value of the resistor R21 (580) becomes the output signal 786 of the conversion means shown in FIG. 5, i.e., the detected electric signal 830. The resistor R21 (580) and the capacitor C20 (590) connected between the input and the output of the amplifier 570 form an integrator.

Therefore, in order to detect the knock signal (5 kHz to 15 kHz), the cutoff frequency determined by the resistor R21 (580) and the capacitor C20 (590) must be set larger than the maximum frequency 15 kHz of the knock signal. Hence, the following equation is formulated:

Cutoff frequency fc=1/(2*π*R10*C10)>15 kHz

Further, the noninverting input terminal of the amplifier 570 is connected with a regulating resistor 540 for regulating the voltage level of the DC component of the detected electric signal 830 and an antinoise capacitor 560. The value of the regulating resistor 540 is adjusted so that the detected electric signal 830 may not saturate.

Now, the configuration and operation of the detection means 330 of an embodiment for obtaining the cylinder pressure signal 650 will be described with reference to FIG. 10.

Figure 10:
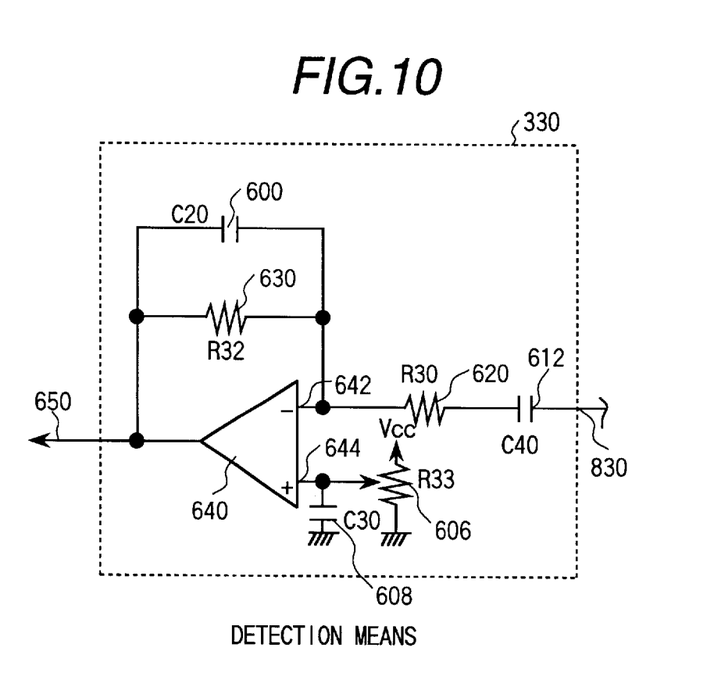
FIG. 10 is a circuit diagram showing a detection means of an embodiment according to the invention.

Referring to FIG. 10, the detected electric signal 830 converted by the conversion means 320 is input to one, inverting, input terminal 642 of the amplifier 640. Further, the voltage $V_{OS}$ of the reference electric signal determined by the resistor 606 for setting the reference voltage established on the basis of the reference pressure for measurement is input to the other, noninverting, input terminal 644 of the amplifier 640. Further, an antinoise capacitor 608 is connected to the input terminal 644. More specifically, the detection means 330 detects the pressure within the combustion chamber through comparison of the voltage $V_{OS}$ of the reference electric signal corresponding to the reference pressure set as the reference for measurement with the detected electric signal 830 corresponding to the pressure within the combustion chamber measured in succession (on the basis, for example, of a correlation such as the difference or ratio between them).

Thus, it is required that the voltage $V_O$ of the corresponding reference electric signal at the actually measured point of time be equalized with the voltage $V_{OS}$ of the reference electric signal set as the reference and, hence, the light quantity control means 300 of the embodiment watches the voltage $V_O$ of the corresponding reference electric signal at the actually measured point of time and controls the light quantity of the passed-through light emitted from the light emitting means 380.

In other words, a change value in the pressure within the combustion chamber is obtained from the difference or ratio between the reference electric signal converted by the conversion means 320 from the light quantity of the passed-through light corresponding to the reference pressure for measurement in the combustion chamber in any of the suction, compression, explosion, and exhaustion processes of the internal combustion engine and the detected electric signal 830 converted by the conversion means 320 from the light quantity of the passed-through light corresponding to the detected pressure in the combustion chamber in each of the cyclic processes. Thereupon, by making conversion on the basis of the difference or ratio, the detected pressure within the combustion chamber is obtained with the reference pressure taken as the reference. Therefore, through checking the actual corresponding reference electric signal corresponding to the reference electric signal on the basis of the detected electric signal 830 each time, the passed-through light emitted from the light emitting means 380 is controlled such that the reference for measurement is kept unchanged, i.e., such that the reference electric signal (voltage $V_{OS}$) corresponding to the set reference pressure and the corresponding reference electric signal (voltage $V_O$) agree with each other at all times.

Now, the configuration and operation of the high-pass filter means 340 of an embodiment for obtaining the knock signal 160 will be described with reference to FIG. 11.

Figure 11:
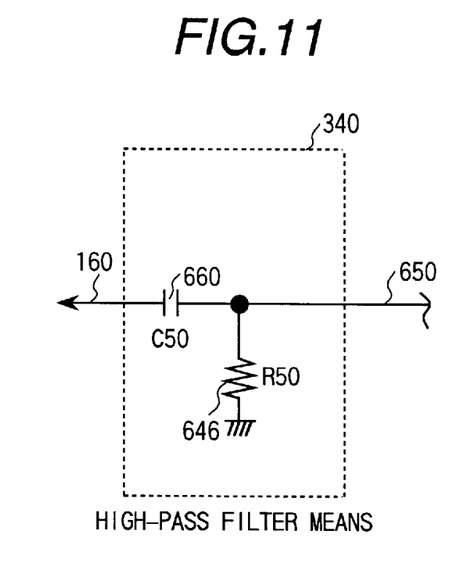
FIG. 11 is a circuit diagram showing a high-pass filter means of an embodiment according to the invention.

Referring to FIG. 11, the configuration is for extracting the knock signal 160 from the cylinder pressure signal 650. The cutoff frequency of the high-pass filter means 340 is required to be set higher than the maximum frequency of engine number of revolutions and smaller than the minimum frequency 5 kHz of the knock signal. For example, in the four-cylinder engine, when the maximum number of revolutions is 6000 rpm, the frequency becomes 200 Hz. Therefore, for obtaining the cutoff frequency fc(knock) of the high-pass filter means 340, selection of the resistor R50 (640) and capacitor C50 (660) must be made to satisfy the following equation:

5 kHz >fc1 =1(2*π*R50*C50)>200 Hz

Thus, the high-pass filter means 340 can extract the knock signal 160 occurring in any of the cylinders 670, 680, 690, and 700.

Now, the configurations and operations of the overcurrent detection means 504 and the cutoff means 505 in an embodiment for protecting the light emitting means 380 will be described with reference to FIG. 7 and FIG. 12.

Figure 12:
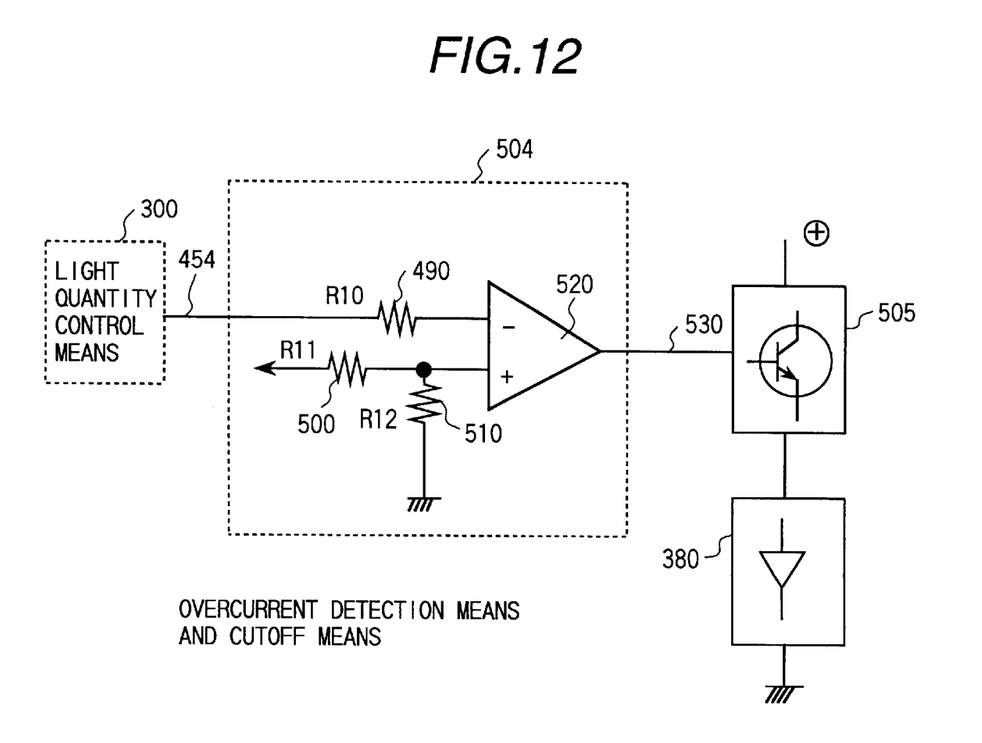
FIG. 12 is a circuit diagram showing an overcurrent detection means and a cutoff means of an embodiment according to the invention.

Referring to FIG. 7 and FIG. 12, in detecting an overcurrent state in the light emitting means 380, a determination is made through inputting the voltage signal 455 of the emitter 454 of the transistor 450 in the light quantity control means 300 to the comparator 520. The determination is made according to whether the voltage level of the emitter 454 is larger or smaller than the voltage value divided by two resistors R11 (500) and R12 (510). Namely, when an overcurrent occurs, the voltage level of the emitter 454 becomes larger than the divided voltage value by the two resistors R11 and R12 and, then, the output signal of the comparator 520 goes LOW. Therefore, watching a LOW level signal coming from the comparator 520 as an overcurrent detection signal 530, and having currents passing through the drive circuit of the light quantity control means 300 and the light emitting means 380 cut off, for example, by the transistor of the cutoff means 505, a damage on the light emitting means 380 due to an overcurrent can be prevented from occurring.

According to the on-vehicle fiber-optic cylinder pressure sensor of the embodiment, even when the light quantity is decreased in the event of excessive bending of the optical fiber having a pressure sensitivity disposed on the interior of the engine gasket due to temperature conditions or aged deterioration around the engine gasket, the cylinder pressure can be detected with precision by having the light quantity entering the light sensing means constantly kept unchanged.

Thus, it becomes possible to obtain a cylinder pressure signal with a good S/N ratio even under a wide variety of temperature conditions or existence of an aged deterioration around the engine and a meritorious effect can be obtained that performance of the engine control system can be enhanced.

What is claimed is:

1. An on-vehicle fiber-optic cylinder pressure sensor comprising:

an optical fiber having a pressure-sensitive characteristic capable of converting a change in pressure within a combustion chamber of an internal combustion engine into a change in a light quantity passing therethrough;

light emitting means for providing said light quantity to said optical fiber;

photosensing means for sensing said light quantity passed-through said optical fiber, said light quantity having been changed while passing through said optical fiber;

means for converting said changed light quantity into a detected electric signal;

means for setting a reference electric signal corresponding to a reference pressure; and means for detecting a variation of said pressure within the combustion chamber of the internal combustion engine from said reference pressure by a correlation between said detected electric signal and said reference electric signal;

wherein a corresponding reference electric signal which is determined based on said detected electric signal is monitored and said light quantity emitted from said light emitting means is controlled such that said corresponding reference electric signal and said reference electric signal are equal to each other.

2. An on-vehicle fiber-optic cylinder pressure sensor according to claim 1, wherein control of said light quantity is performed by having the maximum value of said detected electric signal held by peak-hold means and using the maximum value as said corresponding reference electric signal.

3. An on-vehicle fiber-optic cylinder pressure sensor according to claim 2, wherein a time constant of said peak-hold means is set at a value within a range of 5 to 10 times the period of the engine number of revolutions during cranking of said internal combustion engine.

4. A method for sensing pressure in a cylinder of an internal combustion engine, comprising the steps of:

mounting an optical fiber having a pressure-sensitive characteristic to at least one cylinder of the motor vehicle such that pressure developed in the cylinder is transferred to the optical fiber;

injecting a light quantity into the optical fiber;

sensing the injected light quantity that has passed through optical fiber;

converting the sensed light quantity into an electric signal representing a light quantity that has passed through the optical fiber, the light quantity being dependent on pressure in the cylinder;

setting a reference electric signal converted from the light quantity, the reference electric signal representing a reference cylinder pressure;

detecting a variation from the reference pressure and the pressure within the cylinder on the basis of a correlation between the electric signal converted from the light quantity and the reference electric signal thereby detecting the pressure;

monitoring a corresponding reference electric signal which is determined based upon said detected electric signal; and controlling the injected light quantity such that the corresponding reference electric signal and the reference electric signal are equal to each other.

* * * * *